(12) United States Patent
Paleczny et al.

(10) Patent No.: US 8,427,441 B2
(45) Date of Patent: Apr. 23, 2013

(54) PORTABLE ELECTRONIC DEVICE AND METHOD OF CONTROL

(75) Inventors: Todd Robert Paleczny, Heidelberg (CA); Arnett Ryan Weber, Waterloo (CA); Perry Allan Faubert, Surrey (CA); Patrick Clement Strittmatter, Frisco, TX (US)

(73) Assignee: Research In Motion Limited, Waterloo, Ontario (CA)

( * ) Notice: Subject to any disclaimer, the term of this patent is extended or adjusted under 35 U.S.C. 154(b) by 446 days.

(21) Appl. No.: 12/578,141

(22) Filed: Oct. 13, 2009

(65) Prior Publication Data

US 2010/0156844 A1 Jun. 24, 2010

Related U.S. Application Data

(63) Continuation-in-part of application No. 12/342,502, filed on Dec. 23, 2008, now abandoned.

(51) Int. Cl.
*G06F 3/041* (2006.01)

(52) U.S. Cl.
USPC ............ 345/173; 178/18.01; 178/19.01; 310/328; 310/351

(58) Field of Classification Search .... 178/18.01–19.07; 345/173–178; 310/311–371
See application file for complete search history.

(56) References Cited

U.S. PATENT DOCUMENTS

| | | | |
|---|---|---|---|
| 6,359,758 B1 | 3/2002 | Boutaghou | |
| 6,429,846 B2 | 8/2002 | Rosenberg et al. | |
| 6,744,577 B1 | 6/2004 | Guo et al. | |
| 6,822,635 B2 | 11/2004 | Shahoian et al. | |
| 7,205,978 B2 | 4/2007 | Poupyrev et al. | |
| 7,450,110 B2 | 11/2008 | Shahoian et al. | |
| 7,548,232 B2 | 6/2009 | Shahoian et al. | |
| 2004/0070314 A1* | 4/2004 | Yoon et al. ............... | 310/330 |
| 2005/0057528 A1 | 3/2005 | Kleen | |
| 2005/0277448 A1 | 12/2005 | Castaneda et al. | |
| 2006/0050059 A1 | 3/2006 | Satoh et al. | |
| 2006/0119586 A1 | 6/2006 | Grant et al. | |
| 2006/0209037 A1 | 9/2006 | Wang et al. | |
| 2007/0080951 A1 | 4/2007 | Maruyama et al. | |
| 2007/0103449 A1 | 5/2007 | Laitinen et al. | |
| 2007/0152974 A1 | 7/2007 | Kim et al. | |
| 2008/0055277 A1* | 3/2008 | Takenaka et al. .......... | 345/177 |
| 2008/0060856 A1 | 3/2008 | Shahoian et al. | |
| 2008/0068348 A1 | 3/2008 | Rosenberg et al. | |
| 2008/0122315 A1* | 5/2008 | Maruyama et al. ........ | 310/314 |
| 2008/0132313 A1 | 6/2008 | Rasmussen et al. | |

FOREIGN PATENT DOCUMENTS

| | | |
|---|---|---|
| CA | 2518914 A1 | 9/2004 |
| EP | 1310860 A1 | 5/2003 |
| EP | 1691263 A1 | 8/2006 |
| EP | 1748350 A1 | 1/2007 |

(Continued)

OTHER PUBLICATIONS

Extended European Search Report for European Application No. 09173502.7, dated Feb. 23, 2010, 6 pages.

(Continued)

*Primary Examiner* — Michael Pervan (57) ABSTRACT

A portable electronic device includes a touch-sensitive display and a piezoelectric actuator disposed and preloaded on a support and arranged to provide tactile feedback to the touch-sensitive display in response to an actuation signal. The touch-sensitive display may be biased toward the piezoelectric actuator to preload the piezoelectric actuator.

25 Claims, 4 Drawing Sheets

FOREIGN PATENT DOCUMENTS

| | | |
|---|---|---|
| JP | 09-507315 | 6/1995 |
| JP | 10-105243 | 9/1996 |
| JP | 09-173979 | 7/1997 |
| JP | 11-212725 | 8/1999 |
| JP | 2005-149197 | 6/2005 |
| JP | 2006-107140 | 4/2006 |
| JP | 2008059027 | 3/2008 |
| JP | 2008-123453 | 5/2008 |
| JP | 2008-516348 | 4/2009 |
| WO | 0154109 A1 | 7/2001 |
| WO | 2006042309 | 4/2006 |
| WO | WO 2008151863 A1 * | 12/2008 |

OTHER PUBLICATIONS

Extended European Search Report for European Application No. 09172937.6, dated Feb. 10, 2010, 6 pages.
Extended European Search Report for European Application No. 09172940.0. dated Feb. 11, 2010, 6 pages.
Extended European Search Report for European Application No. 09172936.8, dated Feb. 4, 2010, 7 pages.
"Interview Rim" from EPO Examiner on Mar. 19, 2012.
Office Action dated Jan. 11, 2012, issued from corresponding JP patent application No. 2009-279906.
Office Action dated Feb. 16, 2012, issued from corresponding CA patent application No. 2688120.
Japanese Office Action dated Aug. 21, 2012, from corresponding JP patent application 2009-279906, 7 pages.
Chinese Office Action dated Oct. 19, 2012, from corresponding CN patent application 200910262278.5, plus English translation, 12 pages.
Chinese Office Action dated Feb. 5, 2013, from corresponding CN patent application 200910262278.5, including English translation, 14 pages.

* cited by examiner

PORTABLE ELECTRONIC DEVICE AND METHOD OF CONTROL

CROSS-REFERENCE TO RELATED APPLICATIONS

This application is a continuation-in-part of prior U.S. patent application Ser. No. 12/342,502, filed Dec. 23, 2008, the entire contents of which application are incorporated herein by reference.

FIELD OF TECHNOLOGY

The present disclosure relates to portable electronic devices, including but not limited to portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

Improvements in devices with touch-sensitive displays are desirable.

DETAILED DESCRIPTION

The following describes an apparatus for and method of providing tactile feedback for a portable electronic device having a touch-sensitive display. One or more piezoelectric actuators may be utilized to provide tactile feedback to the touch-sensitive display, for example, in response to an actuation signal. The piezoelectric actuators may be mechanically preloaded, such that feedback may be provided by moving the touch-sensitive display in either direction with respect to the housing. The actuators may be controlled, e.g, via a processor, to provide tactile feedback via the touch-sensitive display, for example, to simulate depression or actuation of a switch, such as switch that may be utilized as part of a physical key of a keyboard, e.g., a dome switch, snap switch, or any other type of switch that may be simulated. Other types of tactile feedback may also be provided via such control. Such tactile feedback may be provided in response to depression and release of the touch-sensitive display.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of portable electronic devices include mobile, or handheld, wireless communication devices such as pagers, cellular phones, cellular smartphones, wireless organizers, personal digital assistants, wirelessly enabled notebook computers, and so forth. The portable electronic device may also be a portable electronic device without wireless communication capabilities, such as a handheld electronic game device, digital photograph album, digital camera, or other device.

Figure 1:
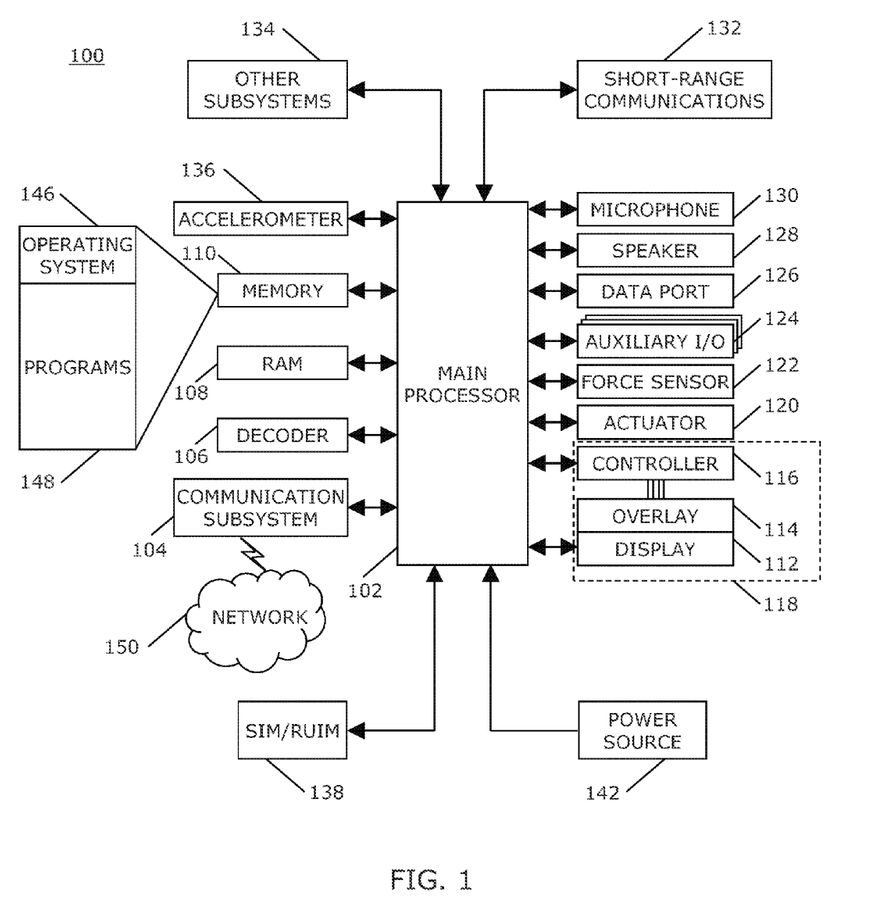
FIG. 1 is a block diagram of a portable electronic device in accordance with the disclosure.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably connected to an electronic controller 116 that together comprise a touch-sensitive display 118, one or more actuators 120, one or more force sensors 122, an auxiliary input/output (I/O) subsystem 124, a data port 126, a speaker 128, a microphone 130, short-range communications 132, and other device subsystems 134. User-interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an accelerometer 136 that may be utilized to detect direction of gravitational forces or gravity-induced reaction forces.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. The controller 116 and/or the processor 102 may detect a touch by any suitable contact member on the touch-sensitive display 118. Multiple simultaneous touches may be detected.

The actuator(s) 120 may be depressed by applying sufficient force to the touch-sensitive display 118 to overcome the actuation force of the actuator 120. The actuator 120 may be actuated by pressing anywhere on the touch-sensitive display 118. The actuator 120 may provide input to the processor 102 when actuated. Actuation of the actuator 120 may result in provision of tactile feedback. Various different types of actuators 120 may be utilized, although only two are described herein. When force is applied, the touch-sensitive display 118 is depressible, pivotable, and/or movable.

Figure 2:
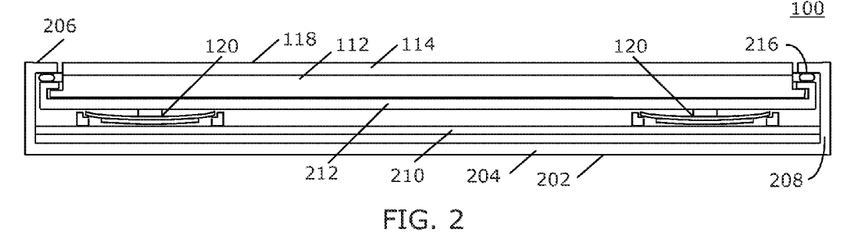
FIG. 2 is a sectional side view of a portable electronic device with piezoelectric actuators in accordance with the disclosure.

A sectional side view of a portable electronic device 100 with piezoelectric ("piezo") actuators 120 is shown in FIG. 2. The cross section is taken through the centers of the actuators 120. The portable electronic device 100 includes a housing 202 that encloses components such as shown in FIG. 1. The housing 202 may include a back 204 and a frame 206 that houses the touch-sensitive display 118. Sidewalls 208 extend between the back 204 and the frame 206. A base 210 extends between the sidewalls 208, generally parallel to the back 204, and supports the actuators 120. The display 112 and the overlay 114 are supported on a support tray 212 of suitable material, such as magnesium. Spacers 216 may be located between the support tray 212 and the frame 206. The spacers 216 may advantageously be flexible and may also be compliant or compressible, and may comprise gel pads, spring elements such as leaf springs, foam, and so forth.

Figure 3:
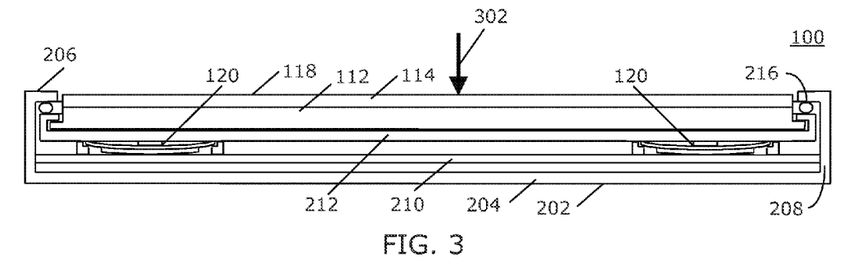
FIG. 3 is a sectional side view of a portable electronic device with a depressed touch-sensitive display in accordance with the disclosure.

The touch-sensitive display 118 is moveable and depressible with respect to the housing 202. A force 302 applied to the touch-sensitive display 118 moves, or depresses, the touch-sensitive display 118 toward the base 210, and when sufficient force is applied, the actuator 120 is depressed or actuated as shown in FIG. 3. The touch-sensitive display 118 may also pivot within the housing to depress the actuator 120. The actuators 120 may be actuated by pressing anywhere on the touch-sensitive display 118. The processor 102 receives a signal when the actuator 120 is depressed or actuated.

Figure 4:
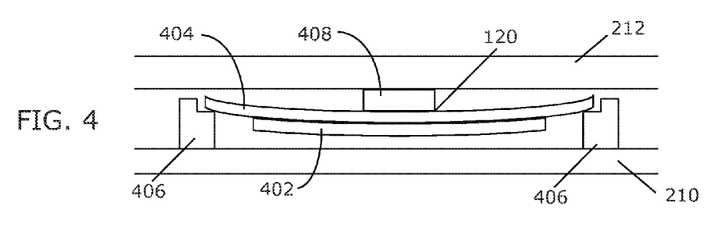
FIG. 4 is a sectional side view of a piezoelectric actuator in accordance with the disclosure.

A sectional side view of a piezo actuator 120 is shown in FIG. 4. The actuator 120 may comprise one or more piezo devices or elements 402. The cross-section of FIG. 4 is taken through the center of one of the piezo actuators 120 utilized in this example. The piezo actuator 120 is shown disposed between the base 210 and the touch-sensitive display 118. The piezo actuator 120 includes a piezoelectric element 402, such as a piezoelectric ceramic disk, fastened to a substrate 404, for example, by adhesive, lamination, laser welding, and/or by other suitable fastening method or device. The piezoelectric material may be lead zirconate titanate or any other suitable material. Although the piezo element 402 is a ceramic disk in this example, the piezoelectric material may have any suitable shape and geometrical features, for example a non-constant thickness, chosen to meet desired specifications.

The substrate 404, which may also be referred to as a shim, may be comprised of a metal such as nickel or any other suitable material such as, for example, stainless steel, brass, and so forth. The substrate 404 bends when the piezo element 402 contracts diametrically, as a result of build up of charge at the piezo element 402 or in response to a force, such as an external force applied to the touch-sensitive display 118.

The substrate 404 and piezo element 402 may be suspended or disposed on a support 406 such as a ring-shaped frame for supporting the piezo element 402 while permitting flexing of the piezo actuator 120 as shown in FIG. 4. The supports 406 may be disposed on the base 210 or may be part of or integrated with the base 210, which may be a printed circuit board. Optionally, the substrate 404 may rest on the base 210, and each actuator 120 may be disposed, suspended, or preloaded in an opening in the base 210. The actuator 120 is not fastened to the support 406 or the base 210 in these embodiments. The actuator 120 may optionally be fastened to the support 406 through any suitable method, such as adhesive or other bonding methods.

A pad 408 may be disposed between the piezo actuator 120 and the touch-sensitive display 118. The pad 408 in the present example is a compressible element that may provide at least minimal shock-absorbing or buffering protection and may comprise suitable material, such as a hard rubber, silicone, and/or polyester, and/or may comprise other materials such as polycarbonate. The pad 408 may provide a bumper or cushion for the piezo actuator 120 as well as facilitate actuation of the piezo actuator 120 and/or one or more force sensors 122 that may be disposed between the piezo actuators 120 and the touch-sensitive display 118. The pad 408 does not substantially dampen the force applied to or on the touch-sensitive display 118. The pad 408 is advantageously aligned with a force sensor 122. When the touch-sensitive display 118 is depressed, the force sensor 122 generates a force signal that is received and interpreted by the microprocessor 102. The pads 408 facilitate the focus of forces exerted on the touch-sensitive display 118 onto the force sensors 122. The pads 408 transfer forces between the touch-sensitive display 118 and the actuators 120, whether the force sensors 122 are above or below the pads 408. The pads 408 are advantageously flexible and resilient, and facilitate provision of tactile feedback from the actuators 120 to the touch-sensitive display 118.

Figure 5:
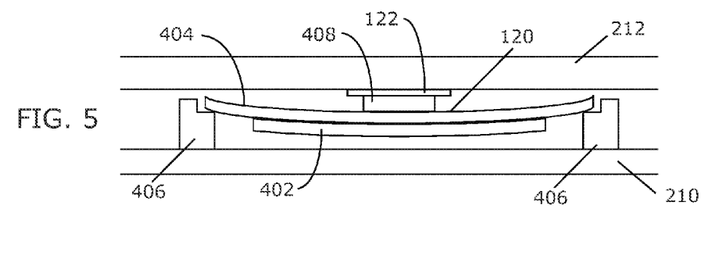
FIG. 5 is a sectional side view of a piezoelectric actuator with a force sensor in accordance with the disclosure.

An optional force sensor 122 may be disposed between the piezo actuator 120 and the touch-sensitive display 118 as shown in FIG. 5. The force sensor 122 may be disposed between the touch-sensitive display 118 and the pad 408 or between the pad and the piezo actuator 120, to name a few examples. The force sensors 122 may be force-sensitive resistors, strain gauges, piezoelectric or piezoresistive devices, pressure sensors, or other suitable devices. Force as utilized throughout the specification, including the claims, refers to force measurements, estimates, and/or calculations, such as pressure, deformation, stress, strain, force density, force-area relationships, thrust, torque, and other effects that include force or related quantities. A piezoelectric device, which may be the piezo element 402, may be utilized as a force sensor.

Force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

Figure 6:
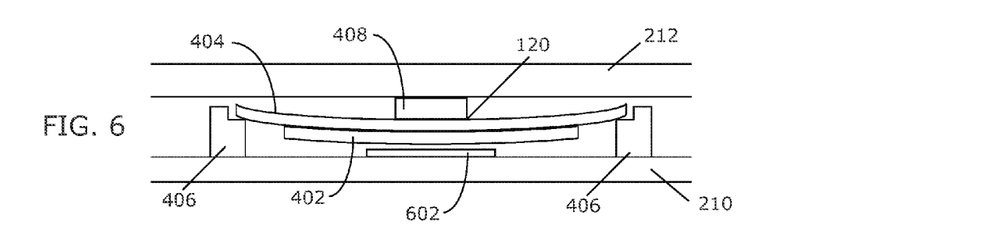
FIG. 6 is a sectional side view of a piezoelectric actuator with a stop in accordance with the disclosure.
Figure 7:
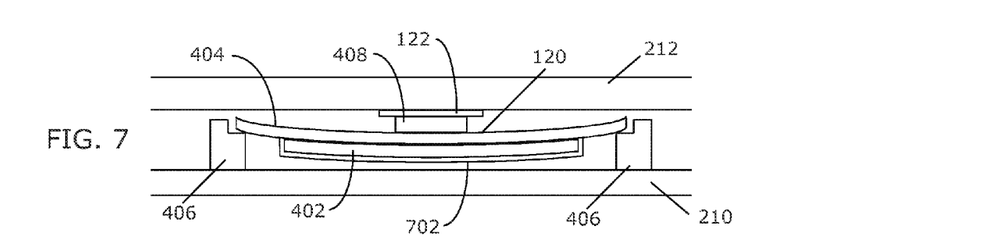
FIG. 7 is a sectional side view of a piezoelectric actuator with a force sensor and a stop in accordance with the disclosure.

An optional stop 602 may be disposed between the piezo actuator 120 and the base 210, as shown in FIG. 6. Alternatively, a stop 702 may be a coating disposed on the piezo element 402, such as shown in FIG. 7. The stop 602, 702 provides an endpoint for the travel or movement of the piezo element 402 toward the base 210. The stop 602, 702 and may cushion or buffer the piezo element 402 to distribute the load as the movement of piezo element 402 ends. The stop 602, 702 advantageously does not affect the tactile feedback provided by the actuators 120. The stop 602, 702 may be comprised of silicone or any other compressible or compliant material such as polyester, and/or may comprise other materials such as polycarbonate, and so forth.

The force sensors 122 may be operably connected to a controller, which may include an amplifier and analog-to-digital converter, and the piezo actuators 120 may be connected to a piezo driver (not shown) that communicates with the controller, as known in the art. The controller may determine force values for each of the force sensors 122. The controller may be in communication with the processor 102 or may be part of the processor 102 or controller 116. The controller controls the piezo driver that controls the voltage to the piezo elements 402, and thus controls the charge and the force applied by the piezo actuators 120 on the touch-sensitive display 118. The piezoelectric disks 402 may be controlled substantially equally and concurrently, unequally, and/or separately.

The piezo actuator 120 provides tactile feedback for the touch-sensitive display 118, which tactile feedback simulates the feedback of the depression, or collapse, and release, or return to a rest position, of a mechanical dome switch/actuator, i.e. the piezo actuator 120 provides tactile feedback that simulates the depression and release of a dome switch, for example, based on whether the force of a touch on the touch-sensitive display meets various force thresholds. The piezo actuator 120 may simulate other types of switches and may provide other types of feedback.

Absent an external force and absent a charge on the piezo element 402, the piezo element may be slightly bent due to a mechanical preload, such as shown in FIG. 2 through FIG. 7. As configured within the housing 202, the touch-sensitive display 118 compressively stacks the piezo actuator 120, force sensor 122 (if included), and pad 408 (if included) against the base 210, resulting in a preload of the piezo actuator 120. The piezo actuator 120 may thus be preloaded such that the piezo actuator 120 and the touch-sensitive display 118 are compressively aligned. The touch-sensitive display 118 is shown in FIG. 2 through FIG. 7 biased toward the piezo actuator 120 to preload the piezo actuator 120. The preload results in a bent or curved actuator 120, as a leaf spring, to facilitate provision of tactile feedback in a direction from the actuator 120 toward the touch-sensitive display 118 and in the opposite direction from the touch-sensitive display 118 toward the actuator 120, i.e., up and down from the perspective of the drawing or the z-direction, such as indicated by the arrow 302 in FIG. 3. The piezo actuator 120 may be preloaded such that the piezo actuator 120 is able to provide tactile feedback by displacing the touch-sensitive display 118 in a direction from the piezo actuator toward the touch-sensitive display 118. Thus, tactile feedback to the touch-sensitive display 118, which is movable, may simulate the depression and release of a physical key such as a key of a keyboard or a dome switch. The substrate 404 and piezo element 402 may be manufactured with a slight curve or pre-warp. When the piezo ceramic 402 is adhered to the substrate 404 with acrylic adhesive, heat may be applied as the acrylic cures, which may result in warping. The preload facilitates mechanical coupling between the piezo actuators 120 and the touch-sensitive display 118. The preload of the actuators 120, as shown in the figures, results in a displacement of the center of actuators 120 in the direction of the base 210 or the bottom or back 204 of the housing 202, for example, 50 to 100 microns. Any other suitable preload or displacement may be utilized. The actuators 120 may be further displaced toward the bottom of the housing 202, e.g., 50 to 100 microns, when the touch-sensitive display 118 is depressed as shown in FIG. 3, for example, by an applied force that moves or pivots the touch-sensitive display 118 toward the base 210 or the bottom of the housing 202.

Contraction of the piezo actuators 120 applies a spring-like force, for example, opposing a force externally applied to the touch-sensitive display 118. The substrate 404 bends when the piezo element 402 contracts due to build up of charge at the piezo element 402 or in response to a force, such as an external force applied to the touch-sensitive display 118. The charge may be adjusted by varying the applied voltage or current, thereby controlling the force applied by the piezo element 402 and the resulting movement of the touch-sensitive display. The charge on the piezo element 402 may be removed by a controlled discharge current that causes the piezo element 402 to expand, releasing the force thereby decreasing the force applied by the piezo element 402. The charge may advantageously be removed over a relatively short period of time to provide tactile feedback. Thus, the piezo actuator 120 straightens or flattens as it applies force on the touch-sensitive display 118, and bends more as the touch-sensitive display 118 is depressed.

Figure 8:
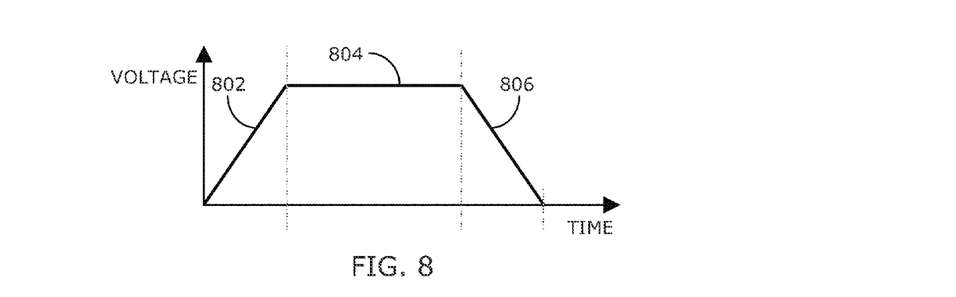
FIG. 8 is a graph of the voltage of a charge cycle of a piezoelectric actuator in accordance with the disclosure.
Figure 9:
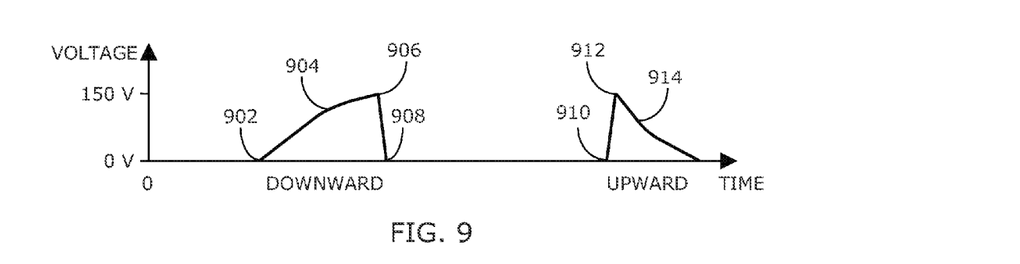
FIG. 9 is a graph of the voltage across the piezoelectric element 402 for a press and release of the touch-sensitive display in accordance with the disclosure.

The graph shown in FIG. 8 illustrates one charge cycle of a piezo actuator 120 with a single charge 802, plateau 804, and a single discharge 806. A single charge cycle may simulate a mechanical switch response, providing tactile feedback. Although the increase in charge 802 and decrease in charge 806 are shown as symmetrical in FIG. 8, the increase and decrease need not be symmetrical. By changing the shape, amplitude, and duration of the voltage, different types of tactile feedback may be provided. For example, FIG. 9 illustrates tactile feedback that simulates the depression and release of a dome-type switch, which is a type of key that may be utilized in a keyboard. The charge and discharge may be performed in a manner that the user does not detect the resultant force on the touch-sensitive display 118, or in a manner intended for a user to detect the resultant force on the touch-sensitive display 118.

A graph of voltage across the piezo disk 402 for a press and release of the touch-sensitive display 118 is shown in FIG. 9. This example illustrates simulation of a dome-type switch as tactile feedback provided by the piezo actuators 120. The voltage across one of the piezo elements 402 versus time is shown. The voltage across the piezo element 402 is related to the charge applied to the piezo element 402. The voltage may vary, for example, between 0 and 150 V. Presuming a touch event begins at time 0, the external force exerted on the touch-sensitive display 118 increases, and the touch-sensitive display 118 moves toward the base 210, resulting in deflection of the piezo actuators 120, such as shown in FIG. 3. When the force is below a first threshold, the piezo actuators 120 are not actuated, as shown before point 902.

When the threshold force is reached at 902, for example, when the force sensors 122 detect or measure the threshold force, the piezo actuators 120 are actuated by applying current to the piezo elements 402. The applied current may be ramped up over a period of time, for example, such that the force on the touch-sensitive display 118 and any resulting deflection of the touch-sensitive display 118 is not detectable by the user. For example, the external force applied to the touch-sensitive display 118 may be about 1.5 N. The piezo actuator 120 provides an opposing spring-like force, and when actuated, may ramp up to an additional opposing force of about 0.7 N over a period of about 20 milliseconds, for example. The curve 904 illustrates the increase in voltage across a piezo disk 402 as a result of the applied current to charge the piezo disks 402. The charge on the piezo elements 402 is removed by a suitable discharge current from point 906 to point 908, thereby reducing the voltage across the piezo disks 402. The charge may be removed over a much shorter period of time than the period of ramp up. For example, the additional opposing force of about 0.7 N may be reduced to about 0 over a period of about 3 milliseconds between the points 906 and 908, thereby causing movement of the touch-sensitive display 118 toward the base 210, simulating collapse of a dome-type switch and providing tactile feedback.

The force on the touch-sensitive display 118 is reduced as the touch-sensitive display 118 is released, e.g., when the user ends the touch event between points 908 and 910. The end of the touch event is detected as the force sensors 122 detect or measure a force that meets a second force threshold. The applied current to the piezo elements 402 is increased, for example over a period of about 3 milliseconds, thereby increasing the voltage across the piezo disks 402, between the points 910 and 912, increasing the force applied by the piezo actuator 120 on the touch-sensitive display 118, e.g., to about 0.7 N. Movement of the touch-sensitive display 118 away from the base 210 results, taking place over a very short period of time when compared to the period of time for ramp down along curve 914 or ramp up along curve 904. The release of a dome-type switch is thus simulated as the provided tactile feedback. The charge on the piezo element 402 is removed by a discharge current, thereby reducing the voltage across the piezo elements 402 to reduce the additional applied force to about 0 along the curve 914. This reduction occurs over a much longer period of time relative to the period of time for simulating release of the dome-type switch. For example, the discharge current may be applied to reduce the voltage across the piezo elements 402 over a ramp down or decay period of about 20 milliseconds, as shown in the downward-sloping segment 914 of the graph of FIG. 9, thereby removing the force applied by the piezo actuators 120, for example, over a period of time such that the reduction is not detected by a user.

The processor 102 generates and provides an actuation signal to the actuators 120 to provide tactile feedback to the touch-sensitive display 118. The actuation signal includes tactile feedback information, such as duration, magnitude or intensity, and frequency of feedback information for the actuators 120. The actuation signal may be based at least in part on the force or the force signal provided by the force sensors 122. The intensity of the feedback may be varied in relation to the amount of the applied force. The actuation signal provides information and/or instructions for how the actuators 120 move the touch-sensitive display 118. The piezo actuators 120 move the touch-sensitive display relative to the housing 202 to provide the tactile feedback. For example, the piezo actuators 120 may move the touch-sensitive display 118 in opposing directions, e.g., in each z direction or up and down from the perspective of FIG. 3, resulting in vibration of the touch-sensitive display 118. The touch-sensitive display 118 may move in an inward direction with respect to the housing 202, i.e., in a direction toward the base 201 or back 204 of the housing 202. The touch-sensitive display 118 may also move in an outward direction with respect to the housing 202, i.e., in a direction away from the base 201 or back 204 of the housing 202. In another example, the provision of tactile feedback may result in a single movement of the touch-sensitive display 118, such as a single pulse or click. The tactile feedback may comprise, for example, vibrations and pulses or clicks, individually or in combination and may simulate various different perceptible tactile sensations. Although the tactile feedback is provided to the touch-sensitive display 118, less intense feedback may be felt along the housing 202.

The actuators 120 may vibrate the touch-sensitive display 118 in opposing directions, e.g., in the z direction or up and down from the perspective of the drawings. The touch-sensitive display 118 vibrates while the housing 202 remains relatively stationary, i.e., the housing 202 is not directly vibrated. The touch-sensitive display 118 may vibrate, for example, at one or more frequencies between 100 and 160 Hz. Alternatively, the touch-sensitive display 118 may vibrate at multiple frequencies, for example, vibrating at 50 Hz for a tenth of a second and then vibrating at 100 Hz for a tenth of a second. The actuators 120 may be controlled to vibrate over various or varied distances. In another example, the actuators 120 may be controlled vibrate the touch-sensitive display 118 across a varying frequency sweep, for example, 0 Hz to 150 Hz and back to 0 Hz in three tenths of a second. Vibrations may be provided at other frequencies and across other frequency ranges. Other tactile feedback, such as pulses, clicks, or pops, may be provided by the piezo actuators 120.

The actuation signal may be generated in response to detecting a depression of the touch-sensitive display 118 that meets a force condition, such as a force associated with selection of an option displayed on the touch-sensitive display 118. The actuation signal may be generated in response to receiving a wireless communication. For example, the portable electronic device 100 may have a setting that results in a vibration instead of an audible notification when an incoming wireless communication is received. The wireless communication may be a voice communication, such as a cellular telephone call, or a data communication, such as an email, short messaging service (SMS) message, text message, and so forth. The actuation signal may be varied according to the identity of a caller of a voice communication or sender of a data communication, thereby providing a tailored notification. The arrangement of piezo actuators 120 may thus be utilized to provide tactile feedback instead of a vibrator motor, which may be eliminated from the design of the portable electronic device 100. The piezo actuators 120 do not need a significant amount of time to come up to speed or slow down, as do vibrator motors, thus the piezo actuators 120 are able to provide vibration or tactile feedback more quickly than a vibrator motor when instructed to provide feedback. Thus, tactile feedback may be provided in response to detected input from the touch-sensitive display 118 or in response to receiving an outside signal, such as a wireless communication.

As described above, the actuators 120 may emulate the feel of a dome switch collapse and subsequent release, which is similar to simulating the press and release of a key of a keyboard. Thus, each time a virtual or soft key is selected by depressing and releasing the touch-sensitive display 118, tactile feedback simulating the press and release of a key is provided via the piezo actuators 120. Such feedback simulates typing on a keyboard comprised of physical keys. Similar or other feedback may be provided when a user selects other displayed options, such as decision windows, e.g., a displayed delete or unlock box. Feedback may be provided during the operation of a camera of a portable electronic device 100. For example, depression of the touch-sensitive display 118 may act as a shutter to take and record a digital picture, and the feedback may simulate the feel of a shutter press and release. Other physical switches may be simulated through tactile feedback provided by the piezo actuators 120.

Figure 10:
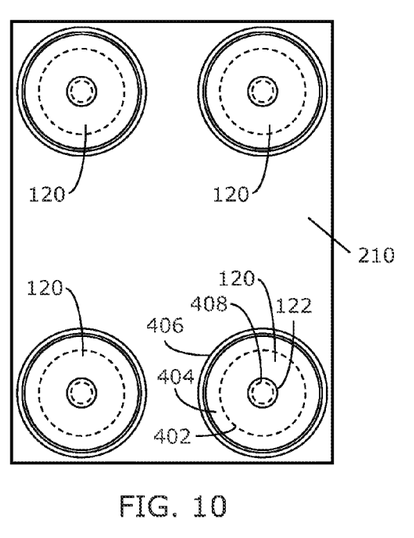
FIG. 10 is a top view of piezoelectric actuators disposed on a base in accordance with the disclosure.

A top view of piezo actuators 120 disposed on a base 210 is shown in FIG. 10. The base 210 may advantageously be a printed circuit board or other suitable structure. Four supports 406 and a piezo actuator 120 is disposed in each support 406. Other electronic and or mechanical components may be disposed on the base 210. A force sensor 122 is shown disposed on each actuator 120. Conductors (not shown) may be disposed on the base 210 to electrically connect each piezo actuator 120 and each force sensor 122 to the processor 102. A pad 408 is shown disposed with respect to each force sensor 120. In this example, four actuators 120 are utilized, one disposed near each corner of the base 210 or near each corner of the touch-sensitive display 118. Although four actuators 120 and force sensors 122 are shown in the example of FIG. 10, one or more devices, e.g., any suitable number of these devices, may be utilized and may be located in any suitable position(s). The force sensors 120, piezo elements 402, substrates 404, supports 406, pads 408, and/or stops 602, 702 are shown with a circular geometry, although any suitable geometry may be utilized for these devices. For example, rectangular, square, oval, and strip shaped actuators may be utilized. Alternatively, the piezo element 402 may be fastened to the top of the substrate 404, between the force sensor 122 and the substrate 404. Any suitable size of the force sensor 122, piezo element 402, the substrate 404, the pad 408, and/or the stop 602, 702 may be utilized. The relative sizes of these devices 122, 402, 404, 408, 602, 702 may be chosen to facilitate the response and feedback desired, as well as to fit within the available space.

The force sensor 122, piezo element 402, the substrate 404, the pad 408, and/or the stop 602, 702 are shown advantageously centered with respect to each other. Such an alignment is advantageous because the center of the piezo element 402 has the largest potential displacement distance in the z direction. Nevertheless, other alignments of the force sensor 122 and the pad 408 that are not near or around the central area of the piezo actuator 120 may be successfully implemented. Other arrangements and organizations of these devices 122, 402, 404, 408, 602, 702 may also be successful, including different orders. Each pad 408 may be optionally fastened to the force sensor 122, the substrate 404, the base 210 or any combination thereof. Each force sensor 122 may be optionally fastened to the pad 408, the substrate 404, the base 210, or any combination thereof. An adhesive, lamination, or other suitable measures/processes may be utilized as a fastening mechanism.

Figure 11:
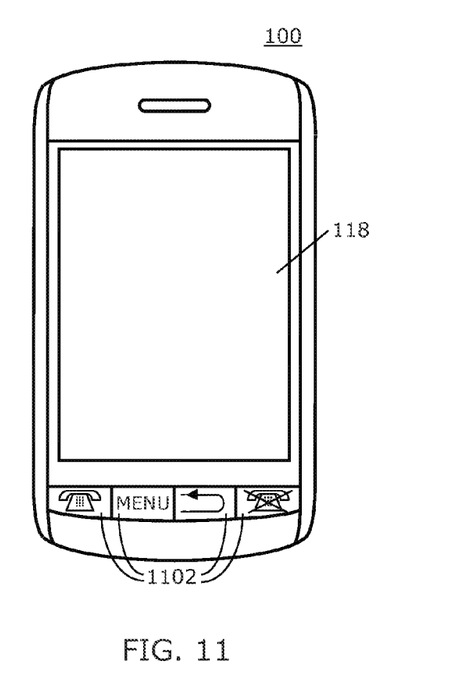
FIG. 11 is a front view of a portable electronic device having a touch-sensitive display in accordance with the disclosure.

A front view of a portable electronic device 100 having a touch-sensitive display 118 is shown in FIG. 11. A housing 202, the speaker 128, and various physical buttons or keys 204 are also shown. Although the keys 204 are shown separate from the touch-sensitive display, the keys 1102 may alternatively be soft or virtual keys displayed on the touch-sensitive display 118. The present disclosure may be applied to other touch-sensitive input devices, such as touch pads with tactile feedback.

Feedback loops resulting from the triggering of the actuators 120 due to forces applied by the actuators 120, may be addressed in software, for example, by any combination of time delays, force thresholds conditions, and so forth.

The methods described herein may be carried out by software executed, for example, by the processor 102. Coding of software for carrying out such a method is within the scope of a person of ordinary skill in the art given the present description. A computer-readable medium having computer-readable code may be executed by at least one processor of the portable electronic device 100 to perform the methods described herein.

Portable electronic devices utilizing piezo actuators as described are able to provide a user with versatile tactile feedback. The piezo actuators, when suspended as described herein, are able to provide tactile feedback, including vibration instead of a vibrator motor, by moving a depressible/movable touch-sensitive display in an upward and/or downward direction, or away from or toward the back of the housing of the portable electronic device. The actuators may be controlled to move the touch-sensitive display upward and downward at almost any time. Tactile feedback may be provided in response to multiple touches in rapid succession. Force information related to a detected touch may be utilized to select information as well as to provide the capability of associating different magnitudes of force with different functions or input. The piezo actuator arrangements described herein may be applied to devices other than portable electronic devices to provide tactile feedback, including devices without touch-sensitive displays.

A portable electronic device comprises a touch-sensitive display and a piezoelectric actuator disposed and preloaded on a support and arranged to provide tactile feedback to the touch-sensitive display in response to an actuation signal. Alternatively, the portable electronic device may comprise a touch-sensitive display and a piezoelectric actuator arranged to provide tactile feedback to the touch-sensitive display in response to an actuation signal, wherein the touch-sensitive display is biased toward the piezoelectric actuator to preload the piezoelectric actuator. In another embodiment, the portable electronic device may comprise a housing; a touch-sensitive display movable with respect to the housing; a piezoelectric actuator preloaded between the housing and the touch-sensitive display; a force sensor arranged such that depression of the touch-sensitive display causes the force sensor to generate a force signal; and a processor configured to receive the force signal and to provide an actuation signal to the piezoelectric actuator, which actuation signal causes the piezoelectric actuator to provide tactile feedback to the touch-sensitive display.

The piezoelectric actuator may be preloaded such that the piezoelectric actuator and the touch-sensitive display are compressively aligned. The touch-sensitive display may be biased toward the piezoelectric actuator to preload the piezoelectric actuator. The piezoelectric actuator may be preloaded such that the piezoelectric actuator provides tactile feedback by displacing the touch-sensitive display in a direction from the piezoelectric actuator toward the touch-sensitive display. The piezoelectric actuator may be preloaded such that the piezoelectric actuator provides tactile feedback by displacing the touch-sensitive display in a direction from the touch-sensitive display toward the piezoelectric actuator. The touch-sensitive display may be depressible or movable with respect to a housing of the portable electronic device. The device may comprise a processor configured to generate an actuation signal. The device may comprise a force sensor disposed between the piezoelectric actuator and the touch-sensitive display. The force sensor may be a force-sensitive resistor. The device may comprise a pad disposed between the piezoelectric actuator and the touch-sensitive display. The device may comprise a stop disposed between the piezoelectric actuator and a base on which the support is disposed. The device may comprise a stop disposed on the piezoelectric actuator. The device may comprise a stop disposed between the piezoelectric actuator and a housing of the portable electronic device, wherein the stop is disposed such that the stop does not interfere with the provision tactile feedback.

A portable electronic device comprises a housing, a touch-sensitive display movable with respect to the housing, and at least one piezoelectric actuator arranged to provide tactile feedback to the touch-sensitive display in response to an actuation signal by moving the touch-sensitive display. The at least one piezoelectric actuator may move the touch-sensitive display in opposing directions, which may result in vibration of the touch-sensitive display. The provision of tactile feedback may result in a single movement of the touch-sensitive display. The touch-sensitive display may move in an inward direction with respect to the housing. The touch-sensitive display may move in an outward direction with respect to the housing. The device may comprise a processor configured to generate the actuation signal. The device may comprise a force sensor disposed between the piezoelectric actuator and the touch-sensitive display. The device may comprise a force sensor, wherein the force sensor is arranged such that depression of the touch-sensitive display causes the force sensor to generate a force signal. The device may comprise a processor configured to generate the actuation signal based at least in part on the force signal. The actuation signal may comprise at least one of duration, magnitude or intensity, and frequency of the tactile feedback. The touch-sensitive display may be biased toward the at least one piezoelectric actuator to preload the at least one piezoelectric actuator.

A method comprises generating an actuation signal that includes tactile feedback information and providing tactile feedback to a touch-sensitive display in response to the actuation signal, wherein at least one piezoelectric actuator moves the touch-sensitive display relative to a housing to provide the tactile feedback. The provision of tactile feedback may result in vibration of the touch-sensitive display. The provision of tactile feedback may result in a single movement of the touch-sensitive display. The touch-sensitive display may move in an inward direction with respect to the housing. The touch-sensitive display may move in an outward direction with respect to the housing. The method may comprise generating the actuation signal based at least in part on a force signal. The actuation signal may comprise at least one of duration, magnitude or intensity, and frequency of the tactile feedback. A force sensor may be arranged such that depression of the touch-sensitive display causes the force sensor to generate a force signal. The actuation signal may be generated in response to detecting a depression of the touch-sensitive display that meets a force condition. The actuation signal may be generated in response to receiving a wireless communication.

The drawings are not necessarily drawn to scale. The terms "top" and "bottom," as well as "above" and "below," "horizontal" and "vertical," and "up" and "down" are utilized herein only to provide reference to one's view of the drawings and are not otherwise limiting.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A portable electronic device comprising:
   a touch-sensitive display;
   a piezoelectric actuator disposed and preloaded on a support and arranged to provide tactile feedback to the touch-sensitive display in response to an actuation signal, wherein the piezoelectric actuator and the touch-sensitive display are compressively stacked when the display is not depressed.

2. The portable electronic device of claim 1, wherein the piezoelectric actuator is preloaded such that the piezoelectric actuator and the touch-sensitive display are compressively aligned.

3. The portable electronic device of claim 1, wherein the touch-sensitive display is biased toward the piezoelectric actuator to preload the piezoelectric actuator.

4. The portable electronic device of claim 1, wherein the piezoelectric actuator is preloaded such that the piezoelectric actuator provides tactile feedback by displacing the touch-sensitive display in a direction from the piezoelectric actuator toward the touch-sensitive display.

5. The portable electronic device of claim 1, wherein the piezoelectric actuator is preloaded such that the piezoelectric actuator provides tactile feedback by displacing the touch-sensitive display in a direction from the touch-sensitive display toward the piezoelectric actuator.

6. The portable electronic device of claim 1, wherein the touch-sensitive display is depressible with respect to a housing of the portable electronic device.

7. The portable electronic device of claim 1, further comprising a processor configured to generate an actuation signal.

8. The portable electronic device of claim 1, further comprising a force sensor disposed between the piezoelectric actuator and the touch-sensitive display.

9. The portable electronic device of claim 8, wherein the force sensor is a force-sensitive resistor.

10. The portable electronic device of claim 1, further comprising a pad disposed between the piezoelectric actuator and the touch-sensitive display.

11. The portable electronic device of claim 1, further comprising a stop disposed between the piezoelectric actuator and a base on which the support is disposed.

12. The portable electronic device of claim 1, further comprising a stop disposed on the piezoelectric actuator.

13. The portable electronic device of claim 1, further comprising a stop disposed between the piezoelectric actuator and a housing of the portable electronic device, wherein the stop is disposed such that the stop does not interfere with the provision tactile feedback.

14. The portable electronic device of claim 1, wherein the preload results in a bent or curved actuator.

15. The portable electronic device of claim 1, wherein the piezoelectric actuator is suspended on a support.

16. The portable electronic device of claim 1, wherein the piezoelectric actuator comprises a piezoelectric element disposed on a substrate that is suspended inside the support.

17. The portable electronic device of claim 1, wherein the piezoelectric actuator comprises a piezoelectric element disposed on a substrate that is suspended on the support, wherein the piezoelectric actuator is in compressive alignment with the touch-sensitive display.

18. A portable electronic device comprising:
a touch-sensitive display;
a piezoelectric actuator arranged to provide tactile feedback to the touch-sensitive display in response to an actuation signal, wherein the touch-sensitive display is biased toward the piezoelectric actuator to preload the piezoelectric actuator, and wherein the piezoelectric actuator and the touch-sensitive display are compressively stacked when the display is not depressed.

19. The portable electronic device of claim 18, wherein the piezoelectric actuator is preloaded such that the piezoelectric actuator and the touch-sensitive display are compressively aligned.

20. The portable electronic device of claim 18, wherein the piezoelectric actuator is preloaded such that the piezoelectric actuator provides tactile feedback by displacing the touch-sensitive display in a direction from the piezoelectric actuator toward the touch-sensitive display.

21. The portable electronic device of claim 18, wherein the piezoelectric actuator is preloaded such that the piezoelectric actuator provides tactile feedback by displacing the touch-sensitive display in a direction from the touch-sensitive display toward the piezoelectric actuator.

22. The portable electronic device of claim 18, wherein the touch-sensitive display is movable with respect to a housing of the portable electronic device.

23. The portable electronic device of claim 18, further comprising a force sensor and a pad disposed between the piezoelectric actuator and the touch-sensitive display.

24. A portable electronic device comprising:
a housing;
a touch-sensitive display movable with respect to the housing;
a piezoelectric actuator preloaded between the housing and the touch-sensitive display, wherein the piezoelectric actuator and the touch-sensitive display are compressively stacked when the display is not depressed;
a force sensor arranged such that depression of the touch-sensitive display causes the force sensor to generate a force signal;
a processor configured to receive the force signal and to provide an actuation signal to the piezoelectric actuator, which actuation signal causes the piezoelectric actuator to provide tactile feedback to the touch-sensitive display.

25. The portable electronic device of claim 24, wherein the piezoelectric actuator comprises a piezoelectric element disposed on a substrate that is suspended on a support, wherein the piezoelectric actuator is in compressive alignment with the touch-sensitive display.

* * * * *